United States Patent [19]
Stanton

[11] 3,911,354
[45] Oct. 7, 1975

[54] CONDITION RESPONSIVE CURRENT CONTROL UNIT

[75] Inventor: David J. Stanton, New Brighton, Minn.

[73] Assignee: Honeywell Inc., Minneapolis, Minn.

[22] Filed: Oct. 10, 1974

[21] Appl. No.: 513,904

[52] U.S. Cl. .................. 323/4; 219/494; 236/75; 323/9; 323/19
[51] Int. Cl.² ............................................ G05F 1/56
[58] Field of Search .............. 219/494, 510; 236/75; 317/31; 323/4, 9, 16, 19

[56] References Cited
UNITED STATES PATENTS
3,512,047   5/1970   Garde .................................. 323/4 X
3,555,402   1/1971   Bozarth et al. ........................ 323/4

Primary Examiner—A. D. Pellinen
Attorney, Agent, or Firm—Alfred N. Feldman

[57] ABSTRACT

A condition responsive control unit connected to a condition sensor and which has its output current controlled in a modulated fashion between two calibrated values. The current is applied to a special current modulated solenoid valve or any other type of current operated load. Two load control circuits are used with a common output point to control the current between the two selected load control values.

10 Claims, 3 Drawing Figures

CONDITION RESPONSIVE CURRENT CONTROL UNIT

BACKGROUND AND SUMMARY OF THE INVENTION

Due to the nature of the type of equipment controlled, many condition sensing and control systems use an "off-on" type of operation. This is particularly true where equipment, such as refrigeration equipment, is controlled. Normally the refrigeration compressor is either turned on or off and no attempt is made to modulate the cooling effect from the refrigeration equipment. This is also generally true in heat pump type applications where a solenoid valve switches the equipment between the heating and cooling condition. Due to the nature of the equipment controlled, the off-on type switching function has been all that is necessary.

Recently it has been found practical to provide a modulating type of solenoid valve for control of the condition altering load means and this modulating type of valve requires a modulated current to the valve solenoid. With modulating solenoid valve refrigeration and heat pump equipment, a minimum level of current is needed to start the opening process of the valve and once the valve is fully opened it is undesirable to increase the current flow to the valve as nothing further is being accomplished. The present invention is directed to the application of a condition sensing means and a current control amplifier means of conventional design to operate a novel circuit that establishes a minimum level of current to a modulating type solenoid valve or other load that is to be modulated, and further provides a substantially linear current to that load as the sensing means calls for the further opening or operation of the load up to a normal maximum current flow. The present invention further includes an override circuit which drives the load to an extreme condition in the event the condition sensing means, normally a thermistor, either opens, short circuits, or otherwise malfunctions, depending on the design of the particular system. The present invention provides a simple, biased circuit that can be operated in parallel with a control circuit, both of which are calibrated by the selection of a single resistor in each circuit. The maximum current drawn through the system is limited by providing a voltage breakdown device which limits the voltage generated for control of the final current control output section of the unit.

DESCRIPTION OF THE PREFERRED EMBODIMENT

Figure 1:
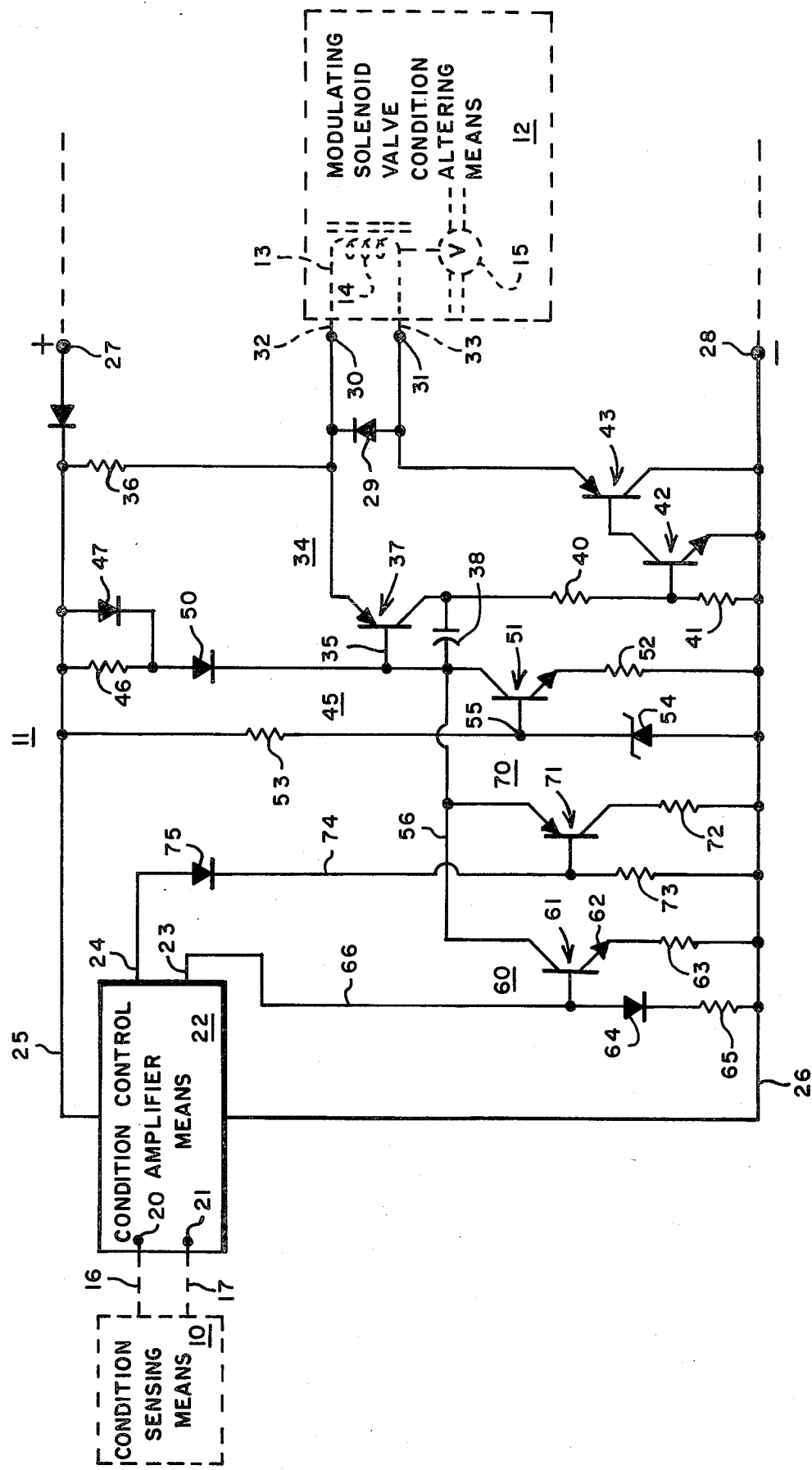
FIG. 1 is a schematic representation of a conventional condition sensing means and condition control amplifier means along with the detailed circuitry of the present invention.

In FIG. 1 a complete condition system is disclosed which includes a condition sensing means 10, a condition responsive control unit 11, and a condition altering the load means 12. While this condition control system can be for any type of variable condition, the present system will be described as being a temperature responsive condition control system in which the condition altering load means 12 is capable of changing the temperature, such as by the control of a modulating solenoid valve 13 in a heat pump or refrigeration system. The modulating solenoid valve 13 is a commercially available unit and has a solenoid coil 14 that operates a valve member 15 in a modulating manner in response to a variation in the amount of current passing through the solenoid 14. Ordinarily, solenoid operated valves are two positioned devices, but recently a solenoid valve has been marketed for refrigeration and heat pump equipment which is capable of being modulated in response to a varying current level in the solenoid 14.

The condition sensing means 10 could be any type of condition sensing device, but in the present application where temperature is being monitored, the condition sensing means 10 is a variable resistance which varies with the condition and preferrable is a simple thermistor. A pair of conductors 16 and 17 are adapted to connect the condition sensing means 10 to the condition responsive control unit 11. This is accomplished by the conductors 16 and 17 being connected to a pair of terminals 20 and 21 in a condition control amplifier means 22, which is in its simplest form a bridge, differential amplifier, and which has a pair of outputs. The first output 23 has a varying current level that varies with the change of condition sensed, while the second output 24 is a switched type of signal control that is used as a condition override in the event that the condition sensing means 10 becomes inoperative and causes the condition control amplifier means 22 to be driven outside of its normal control range. This type of unit has been commercially available for control of devices, such as refrigeration equipment and heat pumps, used in the over the road type of applications where refrigeration equipment is provided in an insulated truck or railway car for control of the temperature and preservation of a perishable cargo.

The condition control amplifier means is supplied on conductors 25 and 26 with a direct current voltage from any convenient direct current source as indicated by a pair of terminals 27 and 28. The terminals 27 and 28 provide a voltage input source for the condition responsive control unit 11. The condition responsive control unit 11 further has a pair of output terminals 30 and 31 which are adapted to be connected by the conductors 32 and 33 to the condition altering means 12. A free wheeling diode 29 is also included in this circuit.

Terminals 30 and 31 form the output terminals for a current control output means disclosed at 34 which has a voltage responsive input control 35. The current control output means is made up of a resistor 36 that supplies voltage to the terminal 30 and to a transistor 37. The voltage responsive input control is a conductor to the base of transistor 37. An oscillation supression capacitor 38 is connected to transistor 37. Transistor 37 is further connected by a pair of resistors 40 and 41 to the conductor 26 to supply the control current for a pair of transistors 42 and 43. Transistor 43 is connected to have an output between terminal 31 and the conductor 26. As the voltage at the voltage responsive input control 35 decreases, transistor 37 increases in conduction thereby providing a larger voltage drop across the resistor 41 driving the transistor 42 and its following transistor 43 further into conduction. This increases the current conduction between the terminals 30 and 31 through the solenoid coil 14 by drawing current through the resistor 36. Resistor 36 builds up a voltage proportional to the current being drawn by the current control output means and is used in a fashion that will be described later in the present description.

The voltage responsive input control 35 is first acted upon by a voltage from a first load control circuit means 45 which includes the impedance 46 and voltage breakdown means 47 in parallel circuit and connected through diode 50 to the voltage responsive input control 35. The diode 50 is further connected through a transistor 51 and a calibrating resistor 52 to the conductor 26. The first load control circuit means 45 is completed by a resistor 53 and a zener diode 54 which are connected to the base of the transistor 51 at 55 to provide a fixed bias generated by the zener diode 54 to cause the transistor 51 to always conduct at some minimum level of current dependent on the voltage drop of the zener diode 54 and the calibrating resistor 52. By conducting at some fixed minimum level, there is always a minimum voltage level applied to the voltage responsive input control 35 due to the voltage drop across the impedance or resistor 46 and the diode 50.

The voltage responsive input control 35 is also connected by conductor 56 to two other transistor circuits that make up a second load control means and a third load circuit means.

The second load control circuit means is generally disclosed at 60 and includes the transistor 61 which has its collector connected to conductor 56 and its emitter 62 connected through a second calibrating resistor 63 to the conductor 26. The transistor 61 is controlled by a voltage drop generated across a diode 64 and resistor 65 which are connected to the base of the transistor 61. The diode 64 is connected by conductor 66 to the output terminal 23 of the condition control amplifier means 22 to receive a proportional control signal responsive to the condition being sensed to thereby vary the conduction of the transistor 61 in a manner that will be described subsequently.

The system is completed by the use of a third load control circuit means 70 which is made up of a transistor 71 connected to the conductor 56 and the conductor 26 along with the resistor 72. The transistor further has a resistor 73 connected to its base and by conductor 74 and diode 75 back to the switching terminal or the override terminal 24 of the conditional control amplifier means 22. The third load control circuit means 70 becomes operative only when the output of terminal of 24 becomes available and this occurs only when the condition control amplifier means 22 is connected to a condition sensing means 10 that is outside of its normal operating range. The operation of the third load control means 70 will be described in connection with the overall operation of the system.

The operation of the system disclosed in FIG. 1 can be best understood if it is initially assumed that the condition sensing means 10 is completely satisfied thereby not requiring the opening of the modulating solenoid valve condition altering means 12. Voltage is present at terminals 27 and 28 and therefore, the condition control amplifier means 22 is active, as is the balance of the circuit. Under these conditions, a current flows from the terminal 27 through the resistor 53 and zener diode 54 thereby biasing the transistor 51 into conduction. Transistor 51 conducts at a level established by the zener diode 54 and the value of the calibrating resistor 52. Current drawn through transistor 51 is drawn through the resistor 46. This generates a slight voltage drop across resistor 46 but the voltage drop is below the 0.6 volts necessary to cause the voltage breakdown means 47 to conduct. The voltage dropped across resistor 46 and diode 50 thereby establish a voltage at the voltage responsive input control 35 below the voltage on the conductor 25. This allows the transistor 37 to become conductive drawing a current through the resistor 36 as well as through the transistor 37. The current being drawn through the transistor 37 generates a voltage drop across the resistor 41 thereby turning on proportionally the transistor 42. The operation of transistor 42 is amplified by the transistor 43 and a current is drawn from the conductor 25 through the resistor 36 and the solenoid 14 to satisfy the conduction needs of the transistor 43. The voltage generated across the resistor 36 becomes equal to the voltage across the resistor 46 and the system becomes stable at its lowest operating current calibration point.

If the condition sensing means then senses a condition which requires the opening of the valve means 12, the condition control amplifier 22 by way of terminal 23 provides a current through the diode 64 and resistor 65. This brings the transistor 61 into conduction and raises the operation from below a first level which is established by the first load control circuit means 45. The conduction of transistor 61 draws current through the conductor 56 and through the resistor 46 and diode 50. The voltage drop across resistor 46, therefore, increases and the voltage at the voltage responsive input control 35 decreases. As the voltage at the voltage responsive input 35 decreases, the transistor 37 is driven further into conduction thereby further driving current through the transistors 42 and 43 along with the solenoid coil 14. The current in the solenoid coil 14 increases proportionally with the current in transistor 61 through the operating range of the device. The upper operating range or limit is established by the bias resistor 63 along with the balance of the circuitry. When the transistor 61 conducts to the point where the voltage across the resistor 46 equals 0.6 volts, the voltage breakdown means of diode 47 begins to conduct. At this point the voltage across the resistor 46 cannot increase further, thereby stabilizing or fixing the upper level of conduction to which the solenoid 14 can be driven. It must be remembered that the voltage across the resistor 36 follows the voltage of the resistor 46 and if the voltage across resistor 46 becomes fixed at a maximum of 0.6 volts the voltage across the resistor 36 can never exceed that value. The diode 50 has been selected to compensate for the diode drop of the transistor 37 thereby making these two parallel circuits, in effect, voltage mirrors of one another.

Once the transistor 61 reaches a current conduction level so that the voltage across the resistor 46 reaches the 0.6 volt level, any further increase in current in transistor 61 causes no further change in the current flowing in the solenoid 14.

The above description is the normal operation of the system. In the event of a failure of the condition sensing means 10, so as to drive the condition control amplifier means 22 outside of its normal operating range, an output is provided at terminal 24 to drive the transistor 71 into conduction. The transistor 71 and resistor 72 are selected so that the conduction of the transistor 71 will always draw enough through the resistor 46 to drive the voltage across resistor 46 up to the 0.6 volt level thereby causing the current control output means 34 to be fully operative and the valve means 12 fully open. The third load control circuit means 70 is an overload protection device that can be conveniently used or eliminated as the needs of the equipment dictate. The operation of the condition responsive control unit is independent of the voltage variations between terminals 27 and 28.

Figure 2:
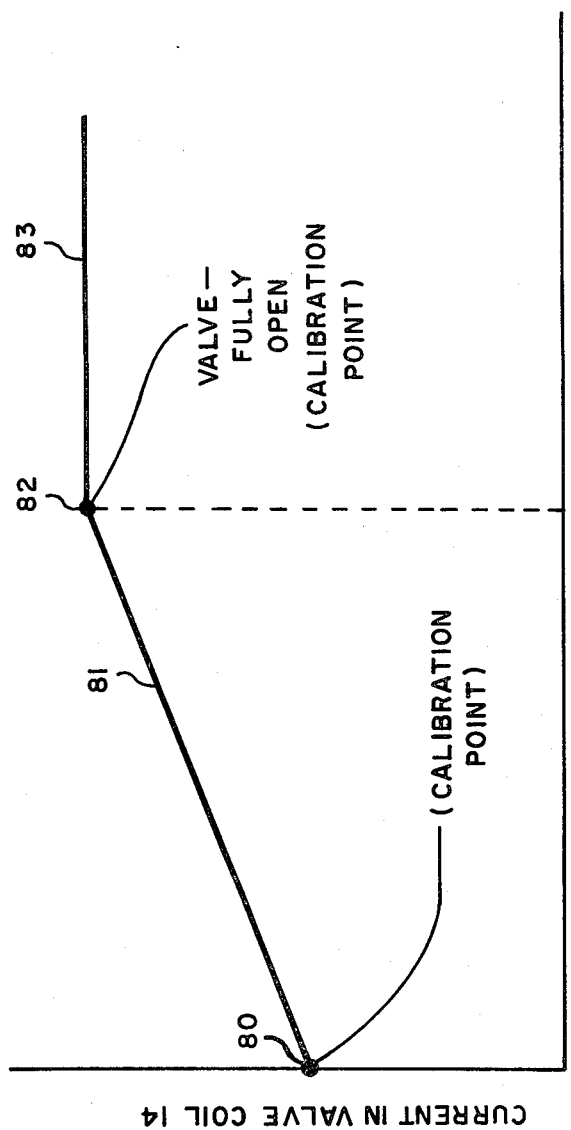
FIG. 2 is a graphic representation of the current in the current control output means of the device versus the condition being controlled.

In FIG. 2 there is a graph of the typical configuration of current versus the controlled condition in the condition altering load means 12. It will be noted that on the current curve, the current in the valve solenoid 14 can only exist beginning at the lower calibration 80. This calibration point is established by the bias configuration of the first load control means 45 by way of the zener diode 54 and the calibrating resistor 52. The increasing current 81 corresponds to the current flow in the solenoid coil 14 as the condition sensing means 10 causes the second load control means 60 to proportionally control additional current to the solenoid 14 until a point 82 is reached. The point 82 is the point in which the second load control means 60 is calibrated by selection of the resistor 63 so that the voltage drop across the resistors 46 and 36 equal the 0.6 volts previously mentioned. It will be noted that at 83 the current remains substantially constant regardless of the control condition once reaching the fully opened calibration point as selected by the parameters of the circuit.

Figure 3:
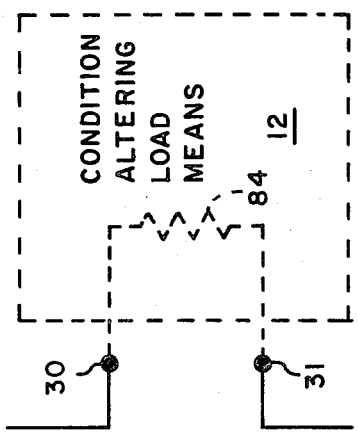
FIG. 3 is a representation of an alternate type of load to that disclosed in FIG. 1.

In FIG. 3, a condition altering load means 12 is again disclosed but in this case the load means is a heating resistor 84. The terminals 30 and 31 of the condition responsive control unit 11 are again disclosed but it is understood that the modulating solenoid valve condition altering means 12 has been replaced by a heating resistor 84 and therefore, the heat generated in the device as disclosed in FIG. 3 is proportional between two fixed limits in accordance with the condition sensing means 10 of FIG. 1.

The present invention has been disclosed in a preferred form including an optional circuit for overload protection. It is quite apparent thay many variations of circuitry can be used to accomplish the same end as is disclosed in detail in the present specification. For this reason, the inventor wishes to be limited in the scope of his invention only by the scope of the appended claims.

The embodiments of the invention in which an exclusive property or right is claimed are defined as follows:

1. A condition responsive control unit, including: condition control amplifier means adapted to be connected to condition sensing means as an input and said control unit having current control output means including a voltage responsive input control; said current control output means adapted to modulate a current in condition altering load means; first load control circuit means having variable voltage output means connected to said voltage responsive input control for said current control output means; said first load control means having a fixed voltage output when said condition control amplifier means has an output below a first level; and second load control circuit means responsive to said condition control amplifier means and connected to said voltage responsive input control to change the voltage at said voltage input control and thereby cause said current control output means to increase said current to said load means.

2. A condition responsive control unit as described in claim 1 wherein said first load control means includes transistor means biased so that said first load control means has said fixed voltage output when said condition control amplifier means has an output below said first level.

3. A condition responsive control unit as described in claim 1 wherein said first load control means includes impedance means and voltage breakdown means in parallel circuit connected to said voltage responsive input control with said breakdown means limiting the voltage that can be developed across said impedance means to thereby limit the voltage to said input control.

4. A condition responsive control unit as described in claim 3 wherein said first load control means includes transistor means biased so that said first load control means has said fixed voltage output when said condition control amplifier means has an output below said first level.

5. A condition responsive control unit as described in claim 1 wherein said second load control means includes transistor means controlled by said condition control amplifier means to vary a current drawn in said first load control means when said amplifier means has an output above said first level.

6. A condition responsive control unit as described in claim 4 wherein said second load control means includes transistor means controlled by said condition control amplifier means to vary a current drawn in said first load control means when said condition control amplifier means has an output above said first level.

7. A condition responsive control unit as described in claim 6 wherein said impedance means is a resistor, and said voltage breakdown means is a diode.

8. A condition responsive control unit as described in claim 7 wherein said biased transistor means includes a zener diode to establish said bias.

9. A condition responsive control unit as described in claim 8 wherein each of said transistor means includes a resistor selected to calibrate the operating limits of said current control output means.

10. A condition responsive control unit as described in claim 1 wherein third load control circuit means responsive to said condition control amplifier means and connected to said voltage responsive input control to change said voltage at said variable voltage input control to override the normal operation of said first and second load control circuit means in the event said condition sensing means becomes inoperative to the extent that said condition control amplifier means has an output in excess of that in a normal operating range for said condition sensing means.

* * * * *